United States Patent
Lohberg et al.

(10) Patent No.: US 6,249,721 B1
(45) Date of Patent: Jun. 19, 2001

(54) ARRANGEMENT FOR DETECTING AND EVALUATING YAWING MOVEMENTS

(75) Inventors: Peter Lohberg, Friedrichsdorf; Heinz Loreck, Idstein, both of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/194,632

(22) PCT Filed: Apr. 18, 1997

(86) PCT No.: PCT/EP97/01956

§ 371 Date: Apr. 1, 1999

§ 102(e) Date: Apr. 1, 1999

(87) PCT Pub. No.: WO97/45304

PCT Pub. Date: Dec. 4, 1997

(30) Foreign Application Priority Data

May 28, 1996 (DE) .............................. 196 21 320

(51) Int. Cl.⁷ ...................................... G06F 7/00
(52) U.S. Cl. ................................. 701/1; 701/31
(58) Field of Search .............. 701/1, 29, 4, 31, 701/34, 36, 124

(56) References Cited

U.S. PATENT DOCUMENTS 3,816,718 * 6/1974 Hall et al. ................................ 701/4

FOREIGN PATENT DOCUMENTS

| 34 17 858 | 5/1987 | (DE) . |
| 40 09 355 | 9/1991 | (DE) . |
| 41 08 807 | 9/1992 | (DE) . |
| 42 08 404 | 9/1992 | (DE) . |
| 44 44 149 | 6/1995 | (DE) . |
| 44 36 162 | 3/1996 | (DE) . |

OTHER PUBLICATIONS

Patent Abstracts of Japan, Pub. #04016710, Pub. Date Jan. 21, 1992, vol. 016, No. 171 (P–1343), Apr. 24, 1992.
Automotive Engineering, Bd. 103, Nr. 9, Sep. 1995, Warrendale US, Seiten 61–63, XP000526647 K. Jost: "Yaw Sensing" siehe Seite 61, rechte Spalte, Zeile 15–Zeile 26.

* cited by examiner

Primary Examiner—William A. Cuchlinski, Jr.
Assistant Examiner—Edward Pipala
(74) Attorney, Agent, or Firm—Rader, Fishman & Grauer PLLC

(57) ABSTRACT

The present invention provides an arrangement for detecting and evaluating yawing movements of an automotive vehicle, serving as an input quantity of an automotive control system, comprising yaw rate sensors (GRS) and electronic circuits (SCU) for processing and evaluating the information obtained by the yaw rate sensors (GRS) and representing the yawing movement of the automotive vehicle, and for generating control signals. Moreover, one or more electronic compass systems (KB, KH) are provided that detect yawing movements of the vehicle independently of the information obtained by the yaw rate sensors (GRS). By comparing the information supplied by the compass systems (KB, KH) to the information supplied by the yaw rate sensors (GRS), the operation of the measuring systems or measuring channels (KB, KH, GRS) is monitored.

5 Claims, 1 Drawing Sheet

ARRANGEMENT FOR DETECTING AND EVALUATING YAWING MOVEMENTS

BACKGROUND OF THE INVENTION

The present invention is concerned with an arrangement for detecting and evaluating of yawing movements of an automotive vehicle which serve as an input quantity of an automatic control system, comprising one or more yaw rate sensors and electronic circuits for processing and evaluating the information obtained by the yaw rate sensors and representing the yawing movements of the automotive vehicle, and for generating control signals.

Measuring and evaluating of yawing movements, namely of angular motions and yawing speeds about the vertical axis of an automotive vehicle, are particularly important in connection with automotive control systems which applies especially to the so-called driving stability control (FRS or ASMS, i.e. automatic stability management system).

Systems for automotive vehicles for controlling and limiting undesired yawing movements about the vertical axis of a vehicle are already known in the art. Intensive development work is designed to improve such systems and to cut manufacturing costs thereof.

In systems of the afore-described type, basically, steering angle, gas pedal position, brake pressure and motion pattern of the vehicle wheels are detected with the aid of sensors, with the nominal yawing movement of the automatic vehicle being computed from such data. At the same time, the transverse acceleration acting upon the automotive vehicle, and the yawing speed are measured. The actual state of yaw of the automotive vehicle is determined from the arithmetic combination of these qualities. If a non-permissive deviation of the actual movement from the nominal movement is detected or imminent, the control is activated, limiting the yawing movement by a controlled actuation of the brake to permissive values not affecting the driving stability.

Driving stability control systems of the afore-described type are required to work with a high precision and reliability in order that the standard and proper driving behavior of the automotive vehicle be maintained, preventing an early activation of the control system affecting the driving comfort or even causing a danger or irritation to the driver.

To that effect, a precise, reliable and error-free determination of the rate of yaw is required. Error-free measured values of the rate of yaw must be detected before the control is affected. It is difficult to measure the yawing movement and to monitor the measuring systems because no defined vehicle motions can be generated in reference to which the yaw rate sensors and the associated evaluating circuits could be checked or calibrated. It is only during standstill of the vehicle that deviations from the zero point can be rectified.

State-of-the-art driving stability control systems employ a single relatively high-precision yaw rate sensor. However, this conception involves the disadvantage that after calibration of the sensor, during standstill of the automotive vehicle, it is no longer possible to directly identify a slowly progressing measured deviation. Such "creeping" inaccuracies can occur as a result of defects of special sensor components or of the evaluating circuits, i.e. as a result of defective condensers, open, high-ohmic semi-conductor inputs, tottering contacts etc.

Errors of this type can only be identified via circumferential factors obtained from auxiliary data or through logical operation that are only indirectly related to the yawing movement. The identifying mechanism responds by a relatively poor resolution and by a higher inertia or delay than in direct reference processes.

To compensate these disadvantages, it will be necessary to detect, in practice, correspondingly more accurate measured values, requiring, in turn, employment of high-precision yaw rate sensors able to provide both a large measuring range and a high dissolution and precision in the small-to-average yaw rates ranges. However, this involves an out-of-proportion relationship between technical efforts and achievable accuracy.

Despite high efforts involved, detection of each and every malfunction of the sensor cannot be safeguarded so that, for safety reasons, the control system will have already to be cut off if temporary circumstances occur arousing the suspicion of malfunction of the system. If such an error or suspected defect occurs during a control operation, the behavior of the system is indefinite. To reduce the malfunction probability to a reasonable degree, maximum requirements must be placed upon the reliability of the components and upon the automatic test function of the sensing system and of the appertaining circuits. Such requirements can, of course, only be complied with by accepting high manufacturing efforts.

It is, therefore, the object of the invention to overcome the afore-described disadvantages involved with conventional systems and sensors and to provide an arrangement of the afore-described type enabling accurate and safe detection of the yawing movement of an automotive vehicle, keeping the efforts and expenses involved low compared to conventional systems, and insuring a quick and safe error detection.

SUMMARY OF THE INVENTION

It has been found that this problem can be solved by providing one or several electronic compass systems able to detect yawing movements of the vehicle independently of the information obtained by the yaw rate sensors, and in that function and accuracy of the measuring systems independent of one another are monitored by comparing the information supplied by the compass system to the information supplied by the yaw sensors.

According to a preferred form of embodiment of the invention, two compass systems arranged in spaced relationship on the vehicle are used in connection with the yaw rate sensors, with the information provided by the two compass systems being compared to the information supplied by the yaw rate sensors for detecting the yawing movements. It is particularly advantageous to arrange one of the two compass systems on the front end and the other on the tail of the vehicle. Special information can be obtained—as will be described hereinafter in greater detail—from the successive occurrence of the output signals of the compass in conjunction with the vehicle movement and travel direction.

An essential feature of the arrangement of the invention resides in that several measuring channels independent of one another exist on the basis of the yaw rate sensors and of the compass systems to supply output signals and information, respectively, enabling, by reference and logical operation, the function of the individual measuring channels to be reliably monitored and the different errors inclusive of so-called "creeping" errors to be detected in due time.

Further features, advantages and fields of application of the invention are disclosed by the following description of details with reference to the enclosed drawings.

DETAILED DESCRIPTION OF THE DRAWINGS

Figure 1:
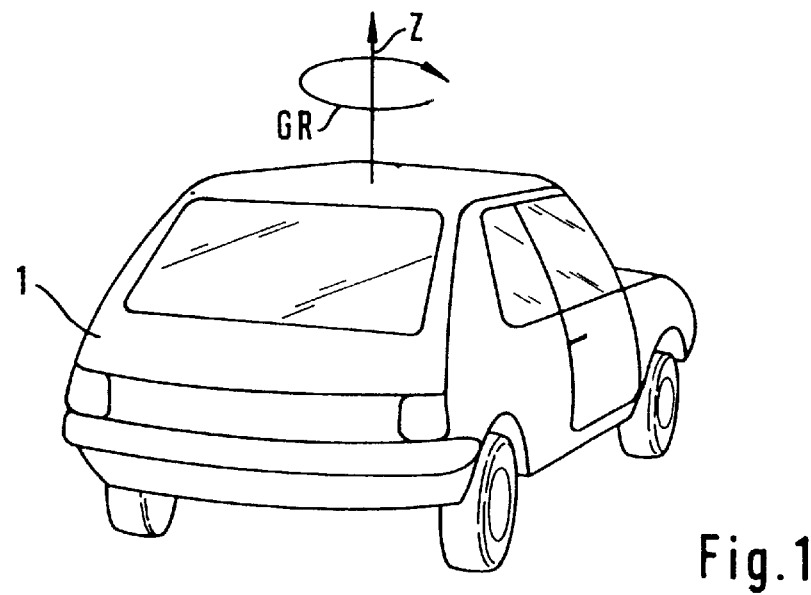
FIG. 1 is a schematically shown perspective view of an automotive vehicle the vertical axis of which is the reference axis for the yawing movement.

FIG. 1 only serves to show the yawing movement of an automotive vehicle 1 which is defined as a rotary movement about the vertical axis Z of the vehicle in the direction of arrow GR. Yawing movement, yawing speed, yawing acceleration and yawing moment have an impact on the driving stability of an automotive vehicle and are, therefore, input qualities of vehicle control systems.

The present invention is based on a modified conception for sensing the yaw rate. The use of compass systems in conjunction with one or more yaw rate sensors, and the employment of several measuring channels independent of one another, virtually, substantially simplifies and improves sensing of the rate of yaw.

Figure 2:
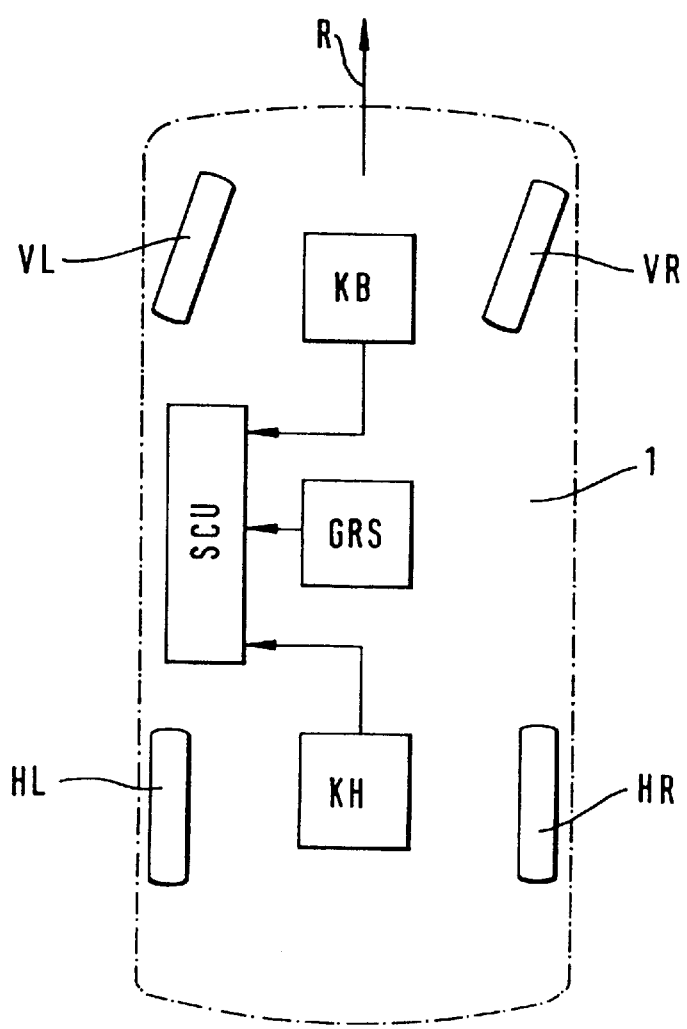
FIG. 2 is a schematically shown view of the basic arrangement of the measuring channels relative to the plane of travel of an automotive vehicle.

FIG. 2 schematically shows the structure of an automotive vehicle 1 including an arrangement of the type provided by the invention. Arrow R schematically indicates the direction of travel of the vehicle 1 as shown when driving straight forward. Reference characters VL, VR refer to the front wheels; reference characters HL, HR to the rear wheels of an automotive vehicle.

In the form of embodiment as shown, the arrangement of the invention comprises a yaw rate sensor GRS and two compass systems KB, KH of which compass system KB is arranged in the front end and compass system KH in the tail of the vehicle.

The (processed) output signals of the yaw rate sensor GRS and of the two compass systems are worked and evaluated in a processor, namely a microcomputer or microcomputer system. Controllers or control systems of this type based on complex microcomputers or microcomputer systems are commonly used in the modern vehicle control technology. FIG. 2 shows a signal processing step SCU which is understood to be a component of the electronic unit of a driving stability control system.

An important feature of the arrangement of the invention resides in the simultaneous use of a plurality of measuring channels independent of one another. In the example according to FIG. 2, these are the measuring channels comprising the two compass systems KB and KH and the yaw rate sensor GRS. By combining the output signals or the data of the yaw rate sensors contained in the output signals with and comparing the same to a compass system KB or KH, the operation of the measuring channels will be monitored. By arranging the compass systems — therefor KB or KH in staggered relationship in the direction of travel R—in the vehicle front end (KH), on the one hand, and in the tail of the vehicle (KB), on the other—a misdirection of the compass under consideration of the direction of travel can be reliably detected.

The yaw rate of the vehicle is continuously computed from the output signals of the compass systems and is then compared to the time-associated measured values of the yawing rate sensor GRS. By so using a plurality of measuring channels on the basis of compass systems and yawing rate sensors—depending on the type of implementation— different advantages and types of information are obtained. However, the basic advantages over the prior art measurement of the yawing movement with the aid of a single, complex yawing rate sensor are always identical. Firstly, the advantages reside in that the parallel operation of a plurality of measuring channels enables the individual measuring channels and compass systems, respectively, and sensors with associated evaluation circuits to be mutually monitored. The degree of conformity of the yawing rate values synchronously detected or computed on the basis of the compass systems KB, KH and of the yaw rate sensor GRS can be used as a direct measurement of the operating safety of the yaw rate sensing system.

When permanently monitoring the measuring channels, defective conditions of structural components, including slowly developing or "creeping" defects of one of the sensors or compass systems involved, can be directly and safely identified. The vehicle control system can then be cut off in time by a known per se monitoring circuit (not shown).

A modified form of embodiment resides in that in case of occurrence of a total failure of the sensor during a control operation which failure is, of course, equally detected by using the parallel measuring channels independent of one another, the control system can alone be operated, for an emergency period, on the basis of the data and signals provided by the intact sensor or the intact compass system.

Accordingly, the arrangement of the invention, as a result of the use of the additional compass systems, involves substantial advantages regarding operating safety, achieving. at the same time, a high-precision yaw rate measurement by using the yaw rate sensor; these advantages are achieved with relatively low technical and manufacturing efforts.

Due to the arrangement of the two compass systems KB, KH in staggered relationship in accordance with the embodiment of FIG. 2, also irregularities of the terrestrial magnetic field, to which a compass responds, can be detected in that first the compass system KB and then the compass system KH are required to respond in the same way both when entering and when leaving a trouble zone (e.g. a tunnel). Once the vehicle speed and, hence, of the phase shift between the output signals of the systems KB and KH due to the vehicle speed are known, a misdirection of the compass can be reliably detected and analyzed to perform a corresponding calibration.

What is claimed is:

1. An arrangement for detecting and evaluating of yawing movements of an automotive vehicle as an input quantity of an automotive vehicle control system, comprising:

at least one yaw rate sensor and electronic circuits for processing data from the at least one yaw rate sensor for generating control signals; and at least two electronic compass systems detecting yawing movements independently of the data obtained by the at least one yaw rate sensor the compass systems being positioned remote from each other in the direction of travel of the automotive vehicle.

2. An arrangement according to claim 1, including a unit for comparing the data supplied by the compass systems with the data supplied by the at least one yaw rate sensor.

3. An arrangement according to claim 1, wherein one compass system is located near the front end and another compass system is arranged near the tail of the automotive vehicle.

4. An arrangement according to claim 1, wherein flux gate-type compass systems are provided as compass systems.

5. An arrangement according to claim 1, wherein at least one sensor based on a tuning-fork oscillator of quartz is the at least one yaw rate sensor.

* * * * *